United States Patent
Frustaci et al.

(10) Patent No.: US 6,933,074 B2
(45) Date of Patent: Aug. 23, 2005

(54) INSULATIVE COMPONENT FOR AN ELECTROCHEMICAL CELL

(75) Inventors: Dominick Frustaci, Williamsville, NY (US); Gary Freitag, East Aurora, NY (US); Paul Hallifax, Gasport, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 479 days.

(21) Appl. No.: 10/200,110

(22) Filed: Jul. 19, 2002

(65) Prior Publication Data
US 2003/0017385 A1 Jan. 23, 2003

Related U.S. Application Data
(60) Provisional application No. 60/306,646, filed on Jul. 19, 2001.

(51) Int. Cl.[7] ............................. H01M 2/14; H01M 2/18
(52) U.S. Cl. ..................... 429/131; 429/129; 429/130
(58) Field of Search ............................ 429/129, 130, 429/131

(56) References Cited

U.S. PATENT DOCUMENTS

| | | | |
|---|---|---|---|
| 2,499,419 A | 3/1950 | Ruben | |
| RE23,427 E | 10/1951 | Ruben | |
| 3,096,216 A | 7/1963 | Warren | |
| 3,269,868 A | 8/1966 | Carson, Jr. | |
| 4,032,696 A | 6/1977 | Urry | |
| 4,816,355 A | 3/1989 | Kulibert et al. | |
| 4,964,877 A | 10/1990 | Keister et al. | |
| 5,447,809 A | 9/1995 | Hafner et al. | |
| 5,607,796 A | 3/1997 | Jacus et al. | |
| 5,882,362 A | 3/1999 | Muffoletto et al. | |
| 6,610,443 B2 * | 8/2003 | Paulot et al. | 429/181 |

* cited by examiner

*Primary Examiner*—Patrick Joseph Ryan
*Assistant Examiner*—Julian Mercado
(74) *Attorney, Agent, or Firm*—Michael F. Scalise

(57) ABSTRACT

An insulator ring for preventing short circuit contact between the opposite polarity electrode in a case-terminal cell design is described. Typically, a lithium/silver vanadium oxide cell is built in a case-negative design with the casing serving at the negative terminal. The cathode is connected to an insulated terminal pin. In a conventional cell construction, the electrode assembly is enclosed in an insulator bag in addition to the electrode separator envelopes before being housed inside the casing. The insulator bag ensures the cathode electrode will not come into short circuit contact with the casing. In the present invention, the insulator bag is replaced with an insulator ring which only protects those portions of the electrode assembly vulnerable to short circuit contact.

28 Claims, 5 Drawing Sheets

INSULATIVE COMPONENT FOR AN ELECTROCHEMICAL CELL

CROSS-REFERENCE TO RELATED APPLICATION

This application claims priority based on provisional application Ser. No. 60/306,646, filed Jul. 19, 2001.

BACKGROUND OF THE INVENTION

1. Field of the Invention

The present invention generally relates to the conversion of chemical energy to electrical energy. More particularly, the present invention relates to an electrode assembly in which the cell stack is not contained within a polymeric enclosure separate from the separators enveloping the anode and cathode electrodes. Eliminating a portion of the conventional polymeric enclosure means that more active materials can be provided inside a casing of a specific volume. This, in turn, means that a cell of increased volumetric efficiency can be contained in a particular casing volume.

2. Prior Art

Conventional electrochemical cells are manufactured of a couple comprised of an anode active material and a cathode active material. An example of this is the lithium/silver vanadium oxide (Li/SVO) cell typically used to power implantable medical devices such as cardiac defibrillators, and the like. These electrochemical couples are built with the anode and cathode electrodes housed in their own separator bags or envelopes. Dedicated separators provide redundancy protection from short circuit contact between the electrodes should one of the separator bags tear or become mechanically compromised.

The individual electrodes are then provided in an electrode assembly such as of a jellyroll type of a serpentine anode with interleaved cathode plates as described in U.S. Pat. No. 4,964,877 to Keister et al. This patent is assigned to the assignee of the present invention and incorporated herein by reference. Before the electrode assembly is housed inside a casing, however, it is inserted into a polymeric "bags", such as of thermoformed ethylene tetra-fluoroethylene (ETFE). The insulator bag provides for electrical insulation between the edges of the electrode assembly and the casing side walls. In a typical Li/SVO cell, the casing serves as the negative terminal connected to the lithium anode while the insulated terminal pin is the positive terminal connected to the cathode electrode. Since the lithium electrode is electrically connected to the casing, it does not need to be isolated or protected from contact with the casing. Thus, an electrically insulative barrier between the anode electrode and the case is not necessary.

The cathode electrode, on the other hand, being electrically connected to the terminal pin is insulated from the casing. Protecting those portions of the cathode electrode not directly opposite the anode electrode from contact with the casing is important to prevent a short circuit condition.

SUMMARY OF THE INVENTION

According to the present invention, an electrode assembly is provided in a casing having a surrounding insulator ring covering only those portions of the cathode electrode not directly opposite the anode electrode. In an electrode assembly constructed of a serpentine electrode with interleaved counter electrode plates or in a jellyroll wind electrode assembly, the insulator ring covers the exposed edges of the counter electrode. In a case-negative electrode design, the anode electrode is the one using the casing as its terminal and the edges of the positive electrode are protected from contacting the casing by the insulator ring. In a case-positive design, the opposite is true. Importantly, the insulator ring is provided in addition to the separator envelopes for each of the anode and cathode electrodes.

The foregoing and additional advantages and characterizing features of the present invention will become clearly apparent upon a reading of the following detailed description together with the included drawings.

DETAILED DESCRIPTION OF THE PREFERRED EMBODIMENTS

Figure 1:
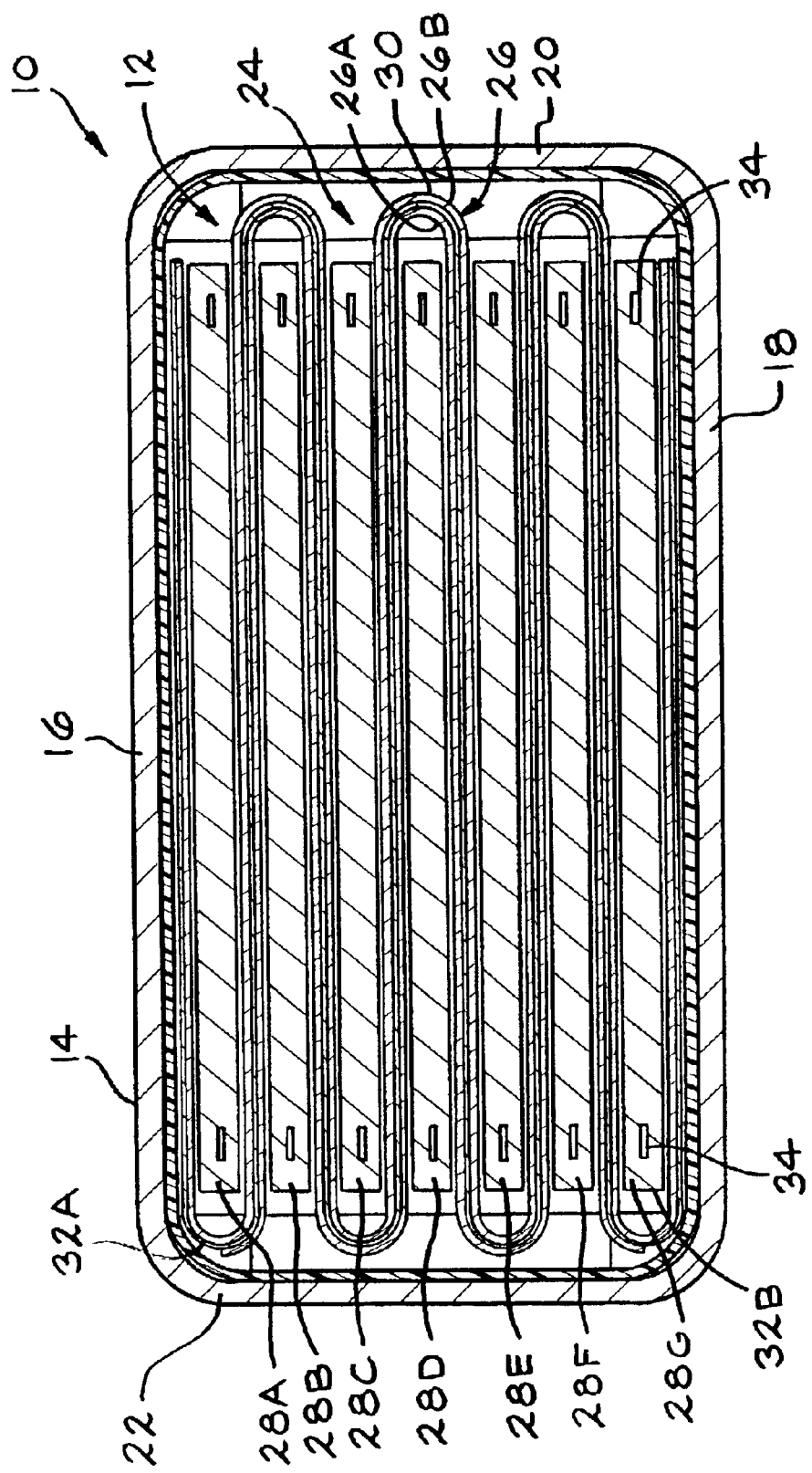
FIG. 1 is a cross-sectional view of an electrode assembly 12 housed inside a prismatic casing 14 according to the prior art.

FIG. 1 shows the conventional or prior art construction for an electrochemical cell 10 including an electrode assembly 12 housed inside a casing 14. The cell casing 14 is of a prismatic, deep drawn type having spaced apart first and second major side walls 16 and 18 extending to and meeting with opposed right and left end walls 20 and 22. The side walls 16, 18 and end walls 20, 22 meet at rounded corners and extend to a bottom wall (not shown). This construction provides an opening 24 in the casing 14 for receiving the electrode assembly 12 therein.

The electrode assembly 12 is comprised of a relatively elongated anode electrode 26 folded in a serpentine shape with a plurality of cathode plates 28A to 28G interleaved between the folds. In the case of a lithium electrochemical cell, the anode comprises opposed sheets 26A and 26B of metallic lithium, or an alloy thereof, pressed against the opposite sides of a conductive current collector 30, except for the two portions 32A and 32B immediately adjacent to the respective casing side walls 16, 18. Since there is no cathode active material directly opposite these portions 32A, 32B, the one side of the anode current collector 30 facing the side walls 16, 18 is devoid of anode active material. Also, since the cell is intended to be built having the anode connected to the casing in a case-negative design, there is no danger of a short circuit occurring should the anode current collector at anode portions 32A, 32B come into direct contact with the casing 14. Suitable anode current collector materials include nickel and copper provided as a screen or foil of the conductive material.

The thusly constructed anode electrode is then provided in a separator envelope (not shown) of a polymeric material, preferably a fluoropolymeric material, such as polyvinylidene fluoride (PVDF), polytetrafluoroethylene (PTFE), or polyethylenechlorotrifluoroethylene. Other suitable materials include polyethylene and polypropylene. The separator is preferably in the form of a cloth or woven fabric and covers the entire anode.

Each of the cathode plates 28A to 28G comprising the cathode electrode is of a cathode active material contacted to the opposed side of a cathode current collect (not shown). In the case of silver vanadium oxide as the cathode active material, a suitable current collector is of aluminum, titanium or stainless steel. A preferred method is to provide the SVO in sheet form as taught in U.S. Pat. No. 5,435,874 to Takeuchi et al. and then press contact the active sheet to the opposite sides of the current collector. This patent is assigned to the assignee of the present invention and incorporated herein by reference. Otherwise, the cathode active mixture can be provided as a pellet or in a powder form pressed to the current collector. For a Li/SVO cell, the preferred cathode active mixture is, by weight, 94% SVO, about 3% PTFE binder and about 3% of a carbonaceous conductive diluent such as powdered graphite or carbon black.

While not shown in FIG. 1, each of the cathode plates 28A to 28B is inserted into a separator envelope before being interleaved between the anode folds. Each cathode current collector includes at least one conductor tab 34. In a preferred construction, there are two conductor tabs, one at each end of the current collector. The tabs 34 are connected to a bus (not shown) which is then connected to a terminal pin (not shown) serving as the cathode terminal insulated from the casing by a glass-to-metal seal (not shown).

Before the electrode assembly 12 is inserted into the casing 14, it is provided in an insulator bag 36 of a polymeric material, such as of a fluoro-polymeric compound in cloth or fabric form. The insulator bag 36 covers all sides of the electrode assembly and provides a secondary structure for preventing direct contact between the cathode plates 28A to 28G and the casing should the primary separator tear or otherwise become mechanically compromised.

The problem is that while the insulator bag 36 is beneficial for preventing direct contact between the ends of the cathode plates 28A to 28G with the casing end walls 20 and 22 should any one of the primary cathode separators tear or otherwise become mechanically compromised, its presence adjacent to anode portions 32A and 32B is not necessarily needed. Since the cell is built in a case-negative design, direct contact between the anode current collector and the casing 14 in the vicinity of anode portions 32A and 32B will not, result in a short circuit. Therefore, the insulation bag portions covering anode portions 32A and 32B only detract from the cell's volumetric efficiency.

Figure 2:
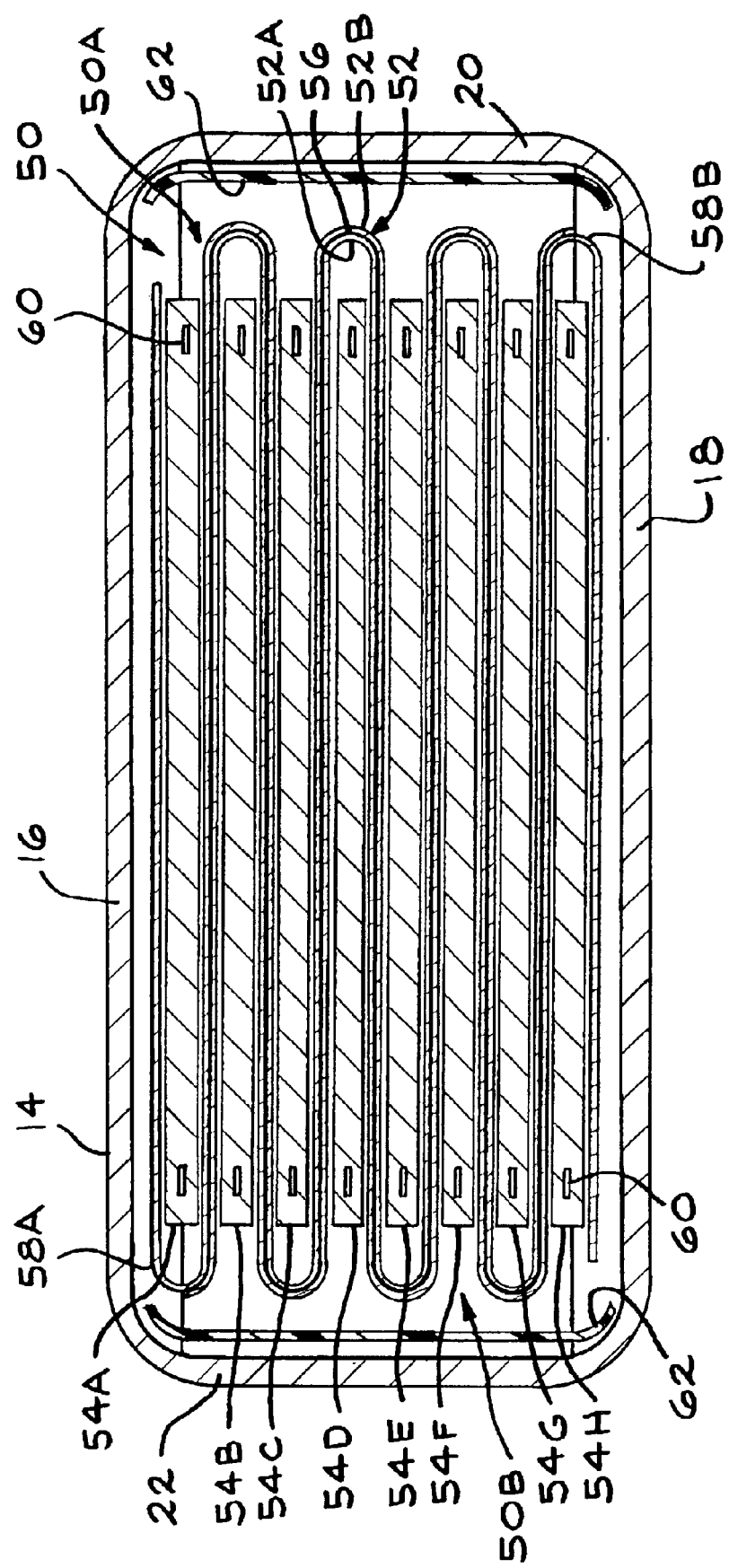
FIG. 2 is a cross-sectional view of an electrode assembly 50 including an insulator ring 62 according to the present invention housed inside a prismatic casing.

Turning now to FIG. 2, there is shown one embodiment of an electrode assembly 50 according to the present invention. In this drawing, the electrode assembly is housed inside the prismatic casing 14 described with respect to FIG. 1. Electrode assembly 50 is comprised of an anode electrode 52 in electrical association with a cathode electrode. The anode and cathode electrodes are built in a similar manner as the previously described prior art anode and cathode electrodes of FIG. 1. In particular, the anode electrode 52 includes two relatively long anode sheets 52A and 52B contacted to opposite sides of an anode current collector 56 except for those portions 58A and 58B immediately adjacent to casing side walls 16 and 18. There, the side of the anode current collector facing the casing side walls is devoid of anode active material. The anode electrode 52 is then provided in a separator envelope.

Similarly, the cathode electrode is comprised of a plurality of cathode plates 54A to 54H, each of a cathode active mixture contacted to opposite sides of a cathode current collector (not shown). The respective cathode current collectors include current collector tabs 60 connected to a bus (not shown) which, in turn, is connected to a terminal pin (not shown). While not shown in the drawing, each cathode plate 54A to 54H is provided in a separator envelope of a polymeric material, preferably a fluoro-polymer, before being interleaved between the anode folds. Up to now, the construction of the present invention electrode assembly 50 is the same as that of the prior art cell of FIG. 1.

According to the present invention, since the anode electrode 52 is connected to the casing 14 with the cell is a case-negative design, the provision of the prior art insulator bag 36 covering anode portions 58A, 58B disposed adjacent to the casing side walls 16 and 18 merely detracts from the cell's volumetric efficiency. In that respect, instead of an insulator bag as in the conventional cell design, an insulator ring 62 is provided. The insulator ring 62 is of a non-porous polymeric material such as polypropylene, polyethylene, PVDF, PTFE and polyethylenechlorotrifluoroethylene and surrounds the electrode assembly 50 adjacent to the opposed edges or ends 50A and 50B of the cathode plates 58A to 58B. Here, it is possible for the cathode plates to move against the casing end walls 20 and 22 and into contact therewith. If the separator envelopes containing the cathode plates should become torn or otherwise mechanically compromised, a short circuit will result. Instead, the insulator ring 62 prevents such direct contact from occurring.

By eliminating the insulator bag 36 of the conventional cell 10 shown in FIG. 1 and replacing it with the insulator ring 62, the space allocated for the bag along the broad faces of the electrode assembly 50 adjacent casing to end walls 20 and 22 is harnessed for placement of active materials. For example, about a 4% increase in the capacity of a cell is realized by eliminating the insulator bag in a cell about 7 cc. in internal volume.

Figure 3:
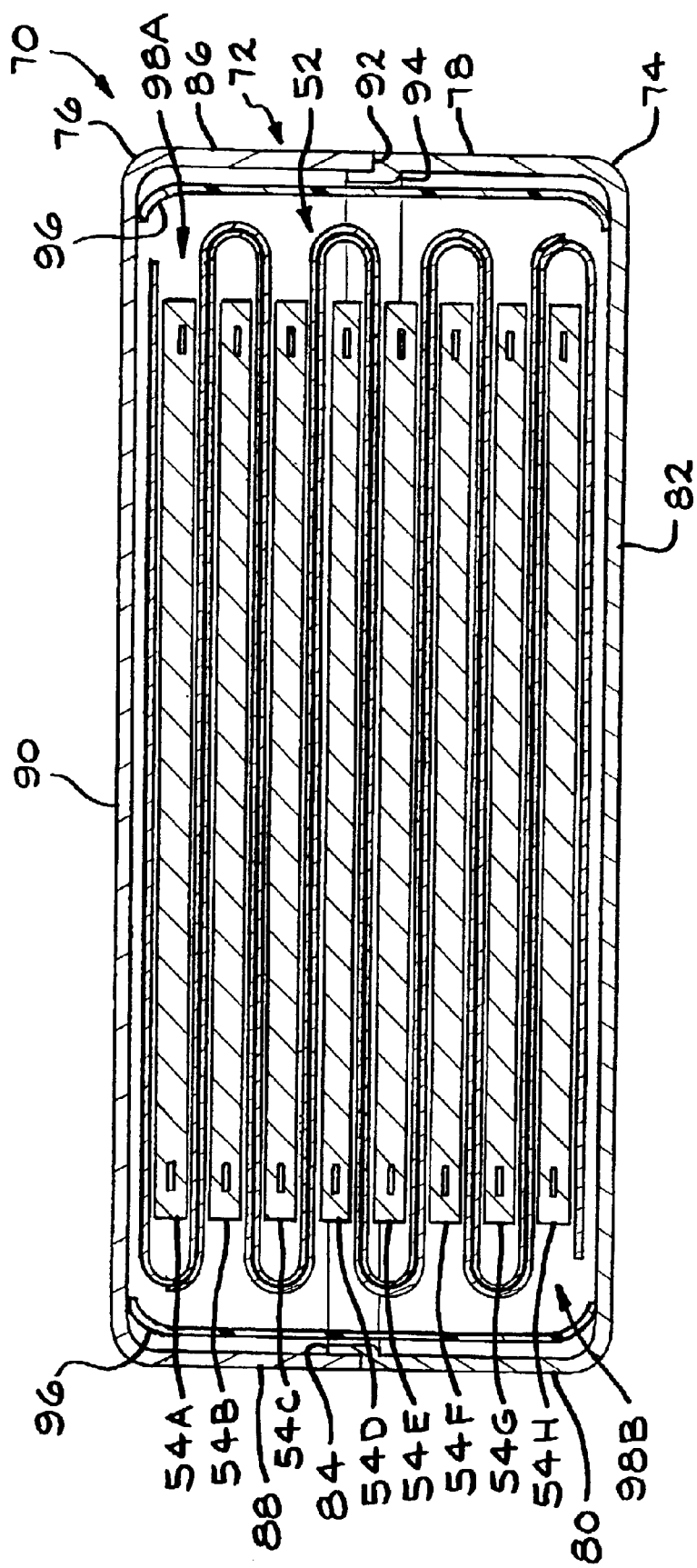
FIG. 3 is a cross-sectional view of another embodiment of the electrode assembly 50 including an insulator ring 96 housed in a mating clam shell type casing 72.

FIG. 3 shows another embodiment of an electrochemical cell 70 according to the present invention. Instead of the electrode assembly 50 being in a prismatic casing as in FIG. 2, it is housed in a casing 72 comprised of first and second clam shell portions 74 and 76 matable together and sealable about their periphery to provide a hermetic enclosure. The first clam shell 74 has a surrounding wall comprised of spaced apart side walls 78 and 80 extending to and meeting with opposed end walls (not shown). The side walls 78, 80 and end walls extend to a front wall 82. Opposite the front wall 82 is a continuous edge 84 of the side walls 78, 80 and end walls.

The second clam shell 76 has a surrounding wall comprised of spaced apart side walls 86 and 88 extending to and meeting with spaced apart end walls (not shown). The side walls 86, 88 and end walls extend to a back wall 90. Opposite the back wall 90 is a continuous edge 92 of the side walls 86, 88 and end walls.

The clam shells are sized such that the side walls and end walls of shell 74 include an inwardly turned lip 94. That way, after the electrode assembly 50 is nested in the clam shell 74, the other clam shell 76 is mated thereto. In this position, the side walls and end walls of clam shell 74 are received in a closely spaced relationship partially covered by the side walls and end walls of clam shell 76. The one continuous edge 92 of clam shell 76 is then secured to the side walls and end walls of clam shell 74, such as by welding. This provides a hermetic closure for the casing. While not shown in the drawing, the casing 72 includes an electrolyte fill opening hermetically sealed by a closure member and a glass-to-metal seal for a terminal pin for the cathode electrode.

As with the cell of FIG. 2, the electrode assembly 50 in this embodiment is shielded from contact with the casing by an insulator ring 96. The polymeric insulator ring 96 is positioned such that the opposed edges or ends 95A and 98B of the cathode plates 54A to 54B are protected from direct physical contact with the side walls 78, 80 of clam shell 74 and the side walls 86, 88 of clam shell 76. As before, the insulator ring is in addition to the separators enveloping each of the cathode plates.

Figure 4:
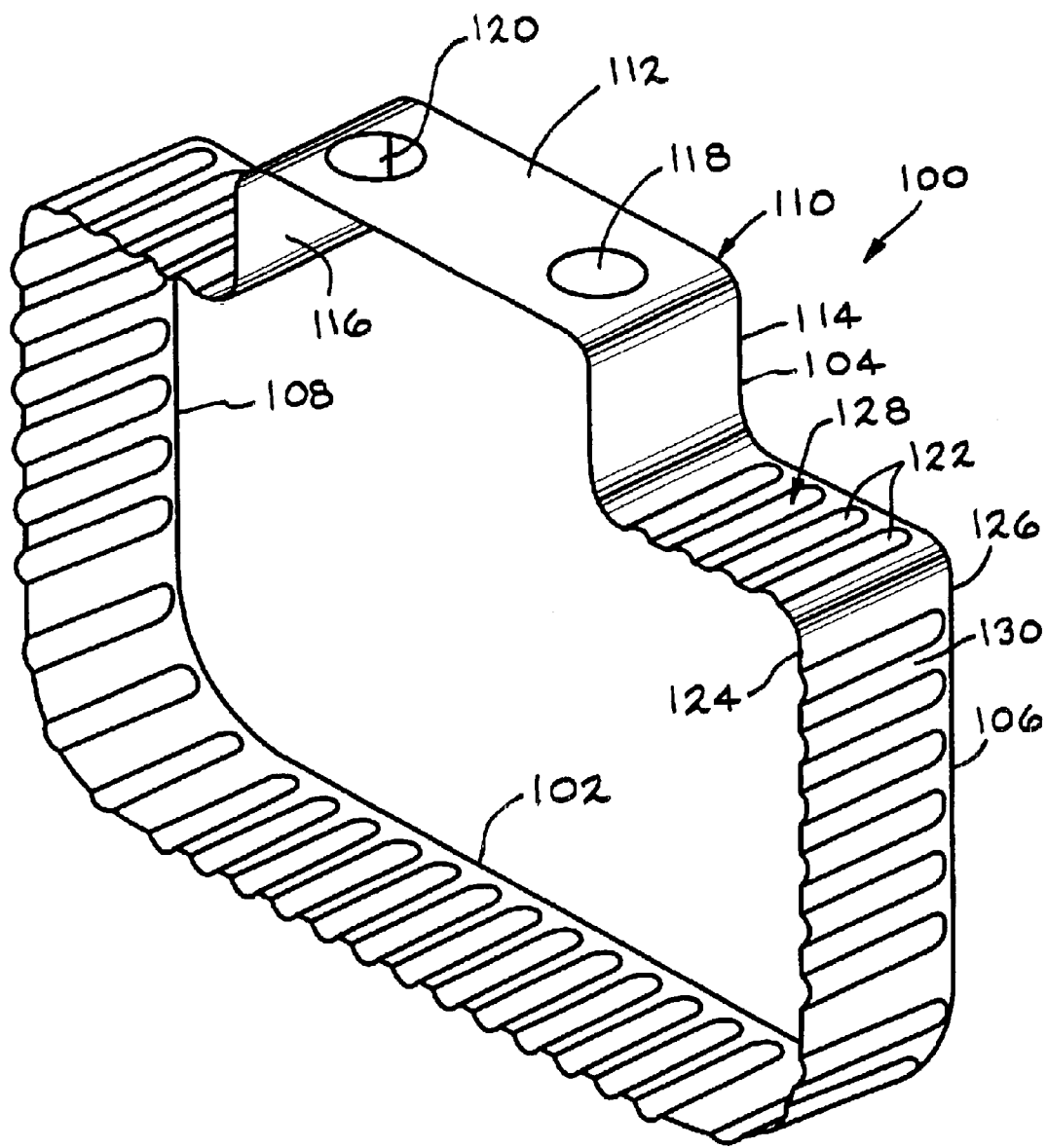
FIG. 4 is a perspective view of a secondary insulator ring 100 according to the present invention.

FIG. 4 shows a secondary insulator ring 100 which is used in lieu of or in conjunction with the primary insulator ring 96. Insulator ring 100 is of a non-porous polymeric material such as polyethylene, polypropylene, ETFE, PTFE or polyethylenechlorotrifluoroethylene. Ring 100 includes a bottom wall 102 opposite a top wall 104. Opposed end walls 106 and 108 connect to the bottom wall 102 and top wall 104. The top wall 104 further includes a raised portion 110 comprising an apertured upper wall 112 intermediate a pair of upstanding walls 114 and 116. The apertures 118 and 120 in the top raised portion 110 are for the purpose of terminal pin structures and the like (not shown) to pass through to corresponding openings in the casing side wall.

The top wall 104, bottom wall 102 and opposed end walls 106, 108 are provided with raised ribs 122 extending from one edge 124 nearly to the other edge 126 thereof. The raised ribs 122 are provided at regularly spaced intervals with rounded crests 128. Planar land portions 130 are located between immediately adjacent ribs 122.

Figure 5:
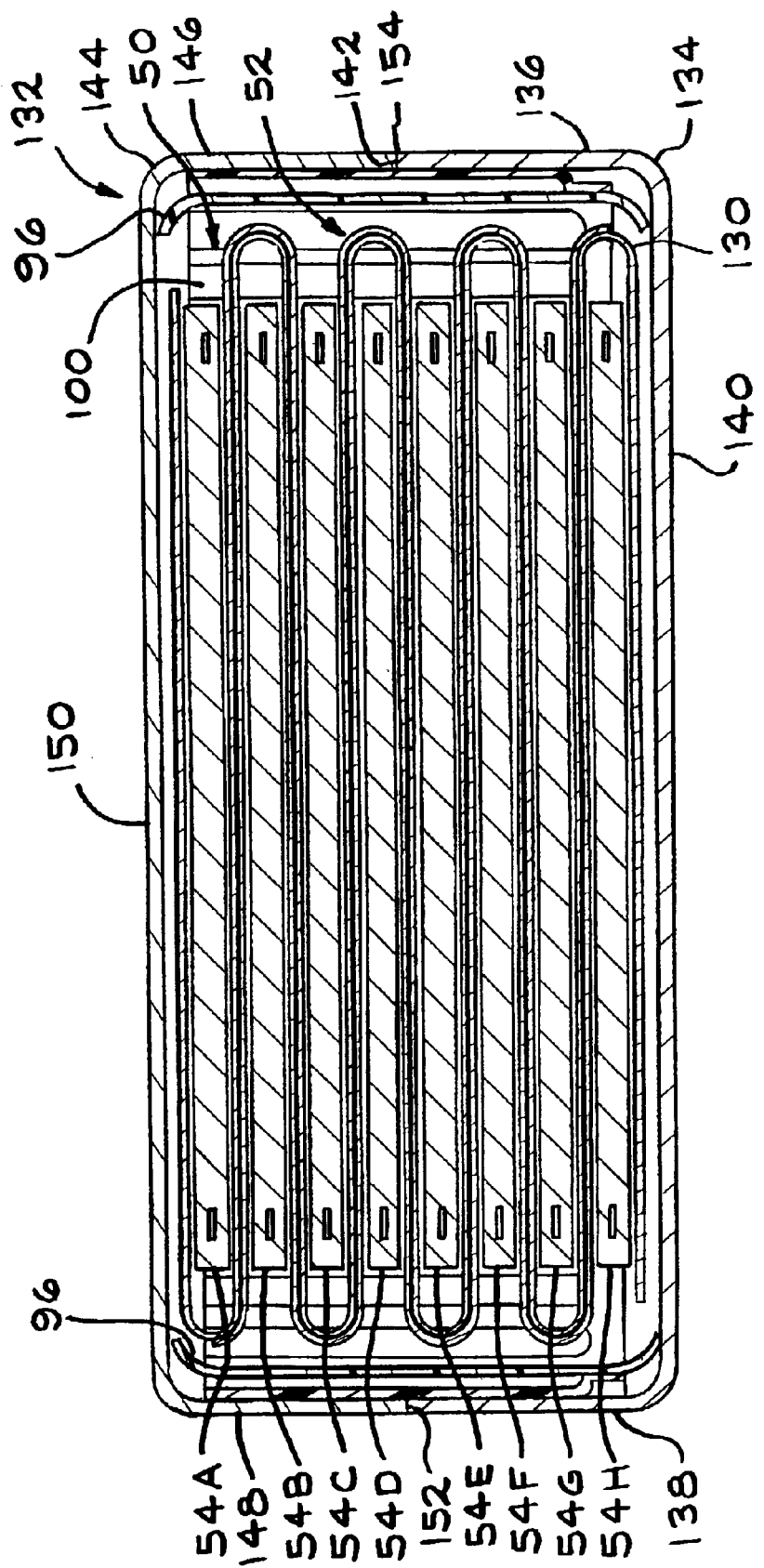
FIG. 5 is a cross-sectional view of another embodiment of the electrode assembly 50 including primary and secondary insulator rings 96 and 100 housed inside a mating clam shell casing 132.

As shown in FIG. 5, the secondary insulator ring 100 is used in conjunction with the primary insulator ring 96, particularly in clam shell casings. Casing 132 is comprised of a first clam shell 134 having a surrounding side wall comprised of spaced apart side walls 136 and 138 extending to opposed end walls (not shown). The side walls 136, 138 and end walls extend to a front wall 140 opposite an edge 142 of the surrounding side wall.

Similarly, the other clam shell 144 is comprised of a surrounding side wall including spaced apart side walls 146 and 148 extending to opposed end walls (not shown). The side walls 146, 148 and end walls extend to a back wall 150 opposite an edge 152 of the surrounding side wall.

The electrode assembly 50 is then positioned inside the primary insulator ring 96 which, in turn, is positioned inside the secondary insulator ring 100. In this position, the land portions 130 of the secondary insulator ring 100 contact the primary insulator ring 96.

After this assembly is nested in one of the clam shells 134 or 144, the other clam shell is mated thereto. This brings the edge 142 of clam shell 134 butted against the edge 152 of clam shell 144. In this position, the crests 128 of the raised ribs 122 of the secondary insulator ring 100 contact the butt seam 154 between the mated clam shells 134, 144. This provides air pockets between the insulator rings 96, 100 at each raised rib 122 that help prevent heat generated during welding the seam 154 from reaching the anode and cathode electrodes. Particularly, if the internal beat becomes too great, it may cause the lithium anode to react in a violent explosion. Also, too much internal heat can damage the electrode separators. In that respect, the air pockets provided between the primary insulator ring 96 and the raised ribs 122 of the secondary insulator ring 100 form convection pathways which transfer comparatively less heat to the electrode assembly than a conductive pathway.

Thus, the combination of the primary insulator ring 96 and secondary insulator ring 100 serves to prevent heat from damaging the electrode assembly. This is especially important in clam shell casings, however, other types of casings such as prismatic and cylindrical shapes can benefit from such an assembly. The insulator rings 96 and 100 also prevent short circuit contact between the cathode plates 54A to 54G and the clam shell side walls.

It is within the scope of the present invention that the cell is of either a primary or a secondary chemistry. For a primary cell, the preferred anode active material is lithium and suitable cathode active materials are selected from silver vanadium oxide, copper silver vanadium oxide, manganese dioxide, cobalt oxide, nickel oxide, copper oxide, titanium disulfide, copper sulfide, iron sulfide, iron disulfide, copper vanadium oxide, carbon, fluorinated carbon, and mixtures thereof. A most preferred couple is a lithium/silver vanadium oxide cell activated with a nonaqueous electrolyte such as a 50:50, by volume, mixture of propylene carbonate and dimethoxyethane.

A secondary cell according to the present invention is of a carbonaceous anode such as graphite, coke, carbon black, mesocarbon microbeads, acetylene black, glassy carbon, and the like. Suitable cathode active materials are those selected from lithiated oxides, lithiated sulfides, lithiated selenides and lithiated tellurides of the group selected from vanadium, titanium, chromium, copper molybdenum, niobium, iron, nickel, cobalt, manganese, and mixtures thereof. A preferred secondary cell is of a carbonaceous material/$LiCoO_2$ couple activated with the electrolyte described in U.S. patent application Ser. No. 09/669,936, which is assigned to the assignee of the present invention and incorporated herein by reference.

It is further within the scope of the present invention that the cell can be of a case-positive configuration. In that respect, the cathode is in the serpentine shape connected to the casing as its terminal. The anode electrode is comprised of plates interleaved in the folds of the cathode and connected to a terminal pin insulated from the casing.

It is appreciated that various modifications to the present inventive concepts described herein may be apparent to those of ordinary skill in the art without departing from the spirit and scope of the present invention as defined by the herein appended claims.

What is claimed is:

1. An electrochemical cell, which comprises:
   a) a casing having a length defined by opposed sidewalls thereof;
   b) an electrode assembly housed inside the casing and comprised of a first electrode of a first polarity and a second electrode of a second, opposite polarity, wherein the second electrode has covered portions substantially covered by the first electrode and at least two uncovered portions not directly opposite the first electrode at opposite ends of the electrode assembly and adjacent to the opposed casing sidewalls, and wherein the first electrode is electrically connected to the casing as its terminal and the second electrode is connected to a terminal lead insulated from the casing;
   c) a primary insulator in the shape of a ring that surrounds the electrode assembly to cover and prevent the uncovered portions of the second electrode at the opposite ends of the electrode assembly from coming into contact with the opposed casing sidewalls; and
   d) an electrolyte provided in the casing to activate the electrode assembly.

2. The electrochemical cell of claim 1 wherein the casing is of a deep drawn prismatic type or of mating first and second members.

3. The electrochemical cell of claim 1 wherein the first electrode is relatively elongated and provided in a serpentine shape with at least two plates of the second electrode interleaved between folds of the serpentine.

4. The electrochemical cell of claim 3 wherein opposed ends of the at least two plates of the second electrode are disposed adjacent to folds of the serpentine first electrode and the primary insulator ring surrounds the electrode assembly so as to cover the opposed ends of the second electrode plates.

5. The electrochemical cell of claim 1 including a secondary insulator ring surrounding the primary insulator ring, the secondary insulator ring comprising a plurality of raised ribs with intermediate lands and wherein a crest of the raised ribs contacts the casing with the lands contacting the primary insulator ring.

6. The electrochemical cell of claim 5 wherein the casing is of matable first and second casing members, the first casing member comprising, a first major face wall connected to a first surrounding side wall and the second casing member comprising a second major face wall connected to a second surrounding side wall and wherein the first and second surrounding side walls are matable to each other to form a seam, and wherein the crests of the raised ribs contact the seam.

7. The electrochemical cell of claim 1 wherein the first electrode is an anode and the second electrode is a cathode.

8. The electrochemical cell of claim 1 built in a case-negative electrical configuration.

9. The electrochemical cell of claim 1 wherein the first electrode is comprised of lithium.

10. The electrochemical cell of claim 1 wherein the second electrode is of a cathode active material selected from the group consisting of silver vanadium oxide, copper silver vanadium oxide, manganese dioxide, cobalt oxide, nickel oxide, copper oxide, titanium disulfide, copper sulfide, iron sulfide, iron disulfide, cooper vanadium oxide, carbon, fluorinated carbon, and mixtures thereof.

11. The electrochemical cell of claim 1 of either a primary or a secondary chemistry.

12. The electrochemical cell of claim 1 wherein the anode is of a carbonaceuous material and the cathode is of an active material selected from the group consisting of lithiated oxides, lithiated sulfides, lithiated selenides and lithiated tellurides of the group selected from vanadium, titanium, chromium, copper, molybdenum, niobium, iron, nickel, cobalt, manganese, and mixtures thereof.

13. An electrochemical cell, which comprises:
  a) a casing of a deep drawn prismatic design closed by a lid, wherein the casing has a length defined by opposed sidewalls;
  b) an electrode assembly housed inside the casing and comprised of a first electrode of a first polarity and a second electrode of a second, opposite polarity, wherein the second electrode has covered portions substantially covered by the first electrode and at least two uncovered portions not directly opposite the first electrode at opposite ends of the electrode assembly and facing the opposed casing sidewalls, and wherein the first electrode is electrically connected to the casing as its terminal and the second electrode is connected to a terminal lead insulated from the casing;
  c) a primary insulator that surrounds the electrode assembly to cover and prevent the uncovered portions of the second electrode at the opposite ends of the electrode assembly from coming into contact with the opposed casing sidewalls; and
  d) an electrolyte provided in the casing to activate the electrode assembly.

14. The electrochemical cell of claim 13 wherein the first electrode is relatively elongated and provided in a serpentine shape with at least two plates of the second electrode interleaved between folds of the serpentine.

15. The electrochemical cell of claim 14 wherein opposed ends of the at least two plates of the second electrode are disposed adjacent to folds of the serpentine first electrode and the primary insulator covers the opposed ends of the second electrode plates.

16. The electrochemical cell of claim 13 wherein the primary insulator is a ring with a secondary insulator surrounding at least a portion of the primary insulator, the secondary insulator comprising a plurality of raised ribs with intermediate lands and wherein a crest of the raised ribs contacts the casing with the lands contacting the primary insulator ring.

17. An electrochemical cell, which comprises:
  a) a casing comprising a first casing member comprising a first major face wall connected to a first surrounding side wall and a second casing member comprising a second major face wall connected to a second surrounding side wall, wherein the first and second casing members are matable to each other at their respective first and second surrounding side walls to form a seam;
  b) an electrode assembly housed inside the casing and comprised of a first electrode of a first polarity and a second electrode of a second, opposite polarity, wherein the second electrode has covered portions substantially covered by the first electrode and uncovered portions not directly opposite the first electrode, and wherein one of the first and second electrodes is electrically connected to the casing as its terminal and the other of the electrodes is connected to a terminal lead insulated from the casing;
  c) a primary insulator that prevents the uncovered portions of the second electrode from coming into contact with the casing; and
  d) an electrolyte provided in the casing to activate the electrode assembly.

18. The electrochemical cell of claim 17 wherein the first electrode is relatively elongated and provided in a serpentine shape with plates of the second electrode interleaved between folds of the serpentine.

19. The electrochemical cell of claim 18 wherein opposed ends of the plates of the second electrode are disposed adjacent to folds of the serpentine first electrode and the primary insulator covers the opposed ends of the second electrode.

20. The electrochemical cell of claim 17 including a secondary insulator surrounding at least a portion of the primary insulator, the secondary insulator comprising a plurality of raised ribs with intermediate lands and wherein a crest of the raised ribs contacts the casing with the lands contacting the primary insulator.

21. A method for providing an electrochemical cell, comprising the steps of:
  a) providing a casing of a deep drawn prismatic design having a length defined by opposed sidewalls thereof;
  b) providing an electrode assembly comprising a first electrode of a first polarity and a second electrode of a second, opposite polarity;
  c) housing the electrode assembly in the casing, wherein the second electrode has covered portions substantially covered by the first electrode and at least two uncovered portions not directly opposite the first electrode at opposite ends of the electrode assembly and facing the opposed casing sidewalls;

d) providing a primary insulator that covers and prevents the uncovered portions of the second electrode at the opposite ends of the electrode assembly from coming into contact with the opposed casing sidewalls;

e) electrically connecting the first electrode to the casing as its terminal and the second electrode to a terminal lead insulated from the casing;

f) activating the electrode assembly with an electrolyte provided in the casing; and g) closing the casing with a lid.

22. The method of claim 21 including providing the first electrode as relatively elongated and in a serpentine shape with at least two plates of the second electrode interleaved between folds of the serpentine.

23. The method of claim 21 including disposing opposed ends of the at least two plates of the second electrode adjacent to folds of the serpentine first electrode and positioning the primary insulator covering the opposed ends of the second electrode plates.

24. The method of claim 21 including providing the primary insulator as a ring at least partly surrounded by a secondary insulator ring, the secondary insulator ring comprising a plurality of raised ribs with intermediate lands and wherein a crest of the raised ribs contacts the casing with the lands contacting the primary insulator ring.

25. A method for providing an electrochemical cell, comprising the steps of:

a) providing a first casing member of a first major face wall connected to a first surrounding side wall and a second casing member of a second major face wall connected to a second major side wall;

b) housing an electrode assembly inside one of the first and second casing members, the electrode assembly comprised of a first electrode of a first polarity and a second electrode of a second, opposite polarity, wherein the second electrode has covered portions substantially covered by the first electrode and uncovered portions not directly opposite the first electrode;

c) providing a primary insulator preventing the uncovered portions of the second electrode from coming into contact with the casing;

d) electrically connecting one of the first and second electrodes to one of the first and second casing members as its terminal and the other of the electrodes to a terminal lead insulated from the one of the first and second casing members;

e) mating the first and second casing members to each other with the first and second surrounding side walls forming a seam; and f) activating the electrode assembly with an electrolyte provided in the casing.

26. The method of claim 25 including providing the first electrode being relatively elongated and in a serpentine shape with plates of the second electrode interleaved between folds of the serpentine.

27. The method of claim 26 including disposing opposed ends of the plates of the second electrode adjacent to folds of the serpentine first electrode and positioning the primary insulator covering the opposed ends of the second electrode.

28. The method of claim 25 including providing the primary insulator as a ring at least partly surrounded by a secondary insulator ring, the secondary insulator ring comprising a plurality of raised ribs with intermediate lands and wherein a crest of the raised ribs contacts the casing with the lands contacting the primary insulator ring.

* * * * *

UNITED STATES PATENT AND TRADEMARK OFFICE
CERTIFICATE OF CORRECTION

PATENT NO. : 6,933,074 B2  
APPLICATION NO. : 10/200110  
DATED : August 23, 2005  
INVENTOR(S) : Frustaci et al.

Page 1 of 1

It is certified that error appears in the above-identified patent and that said Letters Patent is hereby corrected as shown below:

Column 1, line 36, delete "of" and insert --or--.

Column 3, line 5, delete "collect" and insert --collector--.

Column 4, line 12, delete "is" and insert --in--.

Column 4, line 31, delete "casing to" and insert --to casing--.

Signed and Sealed this

Sixteenth Day of December, 2008

JON W. DUDAS  
*Director of the United States Patent and Trademark Office*